United States Patent
Francois

[19]

[11] Patent Number: 5,886,649
[45] Date of Patent: Mar. 23, 1999

[54] AIRCRAFT FLIGHT INDICATOR

[75] Inventor: Daniel Claude Francois, Cornillon, France

[73] Assignee: Eurocopter, Marignane-Cedex, France

[21] Appl. No.: 870,401

[22] Filed: Jun. 6, 1997

[30] Foreign Application Priority Data

Jun. 7, 1996 [FR] France .................................. 96 07041

[51] Int. Cl.$^6$ .................................................. G08B 23/00
[52] U.S. Cl. ........................... 340/969; 340/963; 340/971; 340/978; 340/945; 340/959; 701/99; 701/14; 701/110; 73/178 H
[58] Field of Search ..................................... 340/969, 963, 340/971, 978, 945, 959; 701/99, 3, 14, 110, 121; 360/5; 73/178 H, 178 T

[56] References Cited

U.S. PATENT DOCUMENTS

| | | | |
|---|---|---|---|
| 3,927,307 | 12/1975 | Reschak | 235/151.3 |
| 4,034,605 | 7/1977 | Green | 73/178 H |
| 4,345,327 | 8/1982 | Thuy | 371/36 |
| 4,958,289 | 9/1990 | Sum et al. | 701/99 |
| 5,050,081 | 9/1991 | Abbott et al. | 701/14 |
| 5,315,819 | 5/1994 | Page et al. | 60/39.282 |
| 5,339,244 | 8/1994 | Stiles, Jr. et al. | 340/963 |
| 5,668,542 | 9/1997 | Wright | 340/971 |

FOREIGN PATENT DOCUMENTS

| | | |
|---|---|---|
| 2 731 069 | 8/1996 | France . |
| 3 640 452 | 6/1988 | Germany . |
| 4 125 372 C1 | 8/1992 | Germany . |

*Primary Examiner*—Jeffery A. Hofsass
*Assistant Examiner*—Benjamin C. Lee
*Attorney, Agent, or Firm*—Fisher, Christen & Sabol

[57] ABSTRACT

The present invention relates to an aircraft flight indicator intended to supply a data item regarding the power margin available on at least one engine of the aircraft as a function of the flight conditions. According to the invention, the indicator comprises: a sensor (2) capable of delivering data relating to the speed (Ng) of the gas generator of the engine; means (3) for calculating, using the data relating to the speed (Ng) of the gas generator, a data item ΔNg representing the difference between the actual value of Ng and the reference value on take-off and for processing said data so that it can be displayed; and display means (4) showing the data relating to the values of the speed Ng of the gas generator and/or of ΔNg on a display screen (5).

6 Claims, 1 Drawing Sheet

AIRCRAFT FLIGHT INDICATOR

The present invention relates to an aircraft flight indicator.

Such an indicator is more particularly designed for a rotary-wing aircraft, especially a helicopter.

A helicopter is flown monitoring a great many instruments on the control panel, which instruments for the most part represent the operation of the engine and associated components and the aircraft. For physical reasons, there are many limitations that the pilot has to take into account at every moment during the flight. These various limitations generally depend on the type of flight and on the external conditions.

Most helicopters built these days are equipped with one or two turbine engines, usually with a free turbine. The power is therefore drawn off from a low-pressure stage of the turbine, which stage is mechanically independent of the compressor assembly and of the high-pressure stage of the turbine. As the power turbine of a turbine engine runs at between 20,000 and 50,000 revolutions per minute, a special reduction gearbox—the main gearbox—is needed for connecting it to the rotor(s).

The thermal limitations on the engine and the torque limitations on the main gearbox allow three normal regimes at which the engine is used to be defined:

the take-off speed which can be used for five to ten minutes and which corresponds to a level of torque on the gearbox and to heating up of the engine turbine which are permissible for a short period of time without causing appreciable damage; this is the maximum take-off power (PMD), the maximum continuous speed for which at no time are either the gearbox capabilities or the capabilities resulting from the maximum permissible continuous heating past the high-pressure blading of the first turbine stage are exceeded: this is the maximum continuous power (PMC), the maximum transient speed, defined by the governor stops: this is then known as the maximum transient power (PMT).

There are also emergency excess-power regimes in multi-engined aircraft, which are used if there is a breakdown of one engine:

the emergency regime during which the capabilities of the gearbox on the input stages and the thermal capabilities of the engine are used to their maximum: this is known as super-emergency power (PSU) which can be used for thirty consecutive seconds, at most, and three times during a flight. If PSU is used, then the engine has to be taken out and overhauled;

the emergency regime during which the capabilities of the gearbox on the input stages and the capabilities of the engine are extensively used: this is then known as maximum emergency power (PMU) which can be used for two minutes after PSU or two minutes and thirty seconds consecutively, at most;

the emergency regime during with the capabilities of the gear box in the input stages and the thermal capabilities of the engine are used without causing damage: this is known as intermediate emergency power (PIU) which can be used for thirty minutes continuously for the remainder of the flight following the engine breakdown.

The engine test engineer through calculation or testing establishes the curves of available power of a turbine engine as a function of the altitude and of the temperature, and does this for each of the three regimes defined hereinabove.

The limitations mentioned are generally monitored using various parameters which are displayed on various dials spread out at different points on the aircraft control panel, which of course does not make them easy to read.

The object of the present-invention is to avoid this drawback, and the invention relates to an aircraft flight indicator which gives the pilot a summarized indication which can be easily read and acted upon.

For this purpose, the aircraft flight indicator intended to supply a data item regarding the power margin available on at least one engine of the aircraft as a function of the flight conditions is noteworthy according to the invention in that it comprises:

a sensor capable of delivering data relating to the speed (Ng) of the gas generator of the engine, means for calculating, using the data relating to the speed (Ng) of the gas generator, a data item ΔNg representing the difference between the actual value of Ng and the reference value on take-off and for processing said data so that it can be displayed, and display means showing the data relating to the values of the speed Ng of the gas generator and/or of ΔNg on a display screen.

Thus the pilot (or the copilot) of the aircraft always has summarized easy-to-read data relating to the power margin of the gearboxes and the thermal margins of the engine available to him.

In multiple-engined aircraft, the power margin data items may be shown on separate indicators (one per engine) or grouped together on a single indicator.

The present invention comprises a particular type of calculation which makes it possible to convert the limitations which can vary throughout the field of flight (for example the limiting values NGLIM of NG, which are a function of the altitude and of the external temperature) into fixed positions (for example "paint line" marks on the conventional screen of an indicator) and allow the pointer (value of the NG parameter) to be situated with respect to these fixed positions at all times.

As a preference, the value of the speed Ng of the gas generator is also indicated on said display screen by a digital display which is very useful during engine start-up.

Advantageously, the value of ΔNg is represented, on said display screen, by the position of a pointer moving over a dial.

In particular, said dial has a scale which is graduated in percentages, showing a certain number of regions and marks which correspond to specific operating statuses of the aircraft which the pilot can read easily.

Furthermore, said display screen may comprise an indication of a signal coming from the engine discharge valve and/or show indications relating to the operation of a twin-engined aircraft in which one of the engines has broken down.

The figures of the appended drawing will make it easy to understand how the invention may be embodied.

The aircraft flight indicator according to the invention is intended to give (display) the power margin available on at least one engine of the aircraft as a function of the flight conditions. Although it can be used in other types of aircraft, the following description will refer to the specific example of a rotary-wing aircraft (helicopter) with at least one turbine engine for driving at least one rotor, with the specific monitored engine parameters associated with this example.

Figure 1:
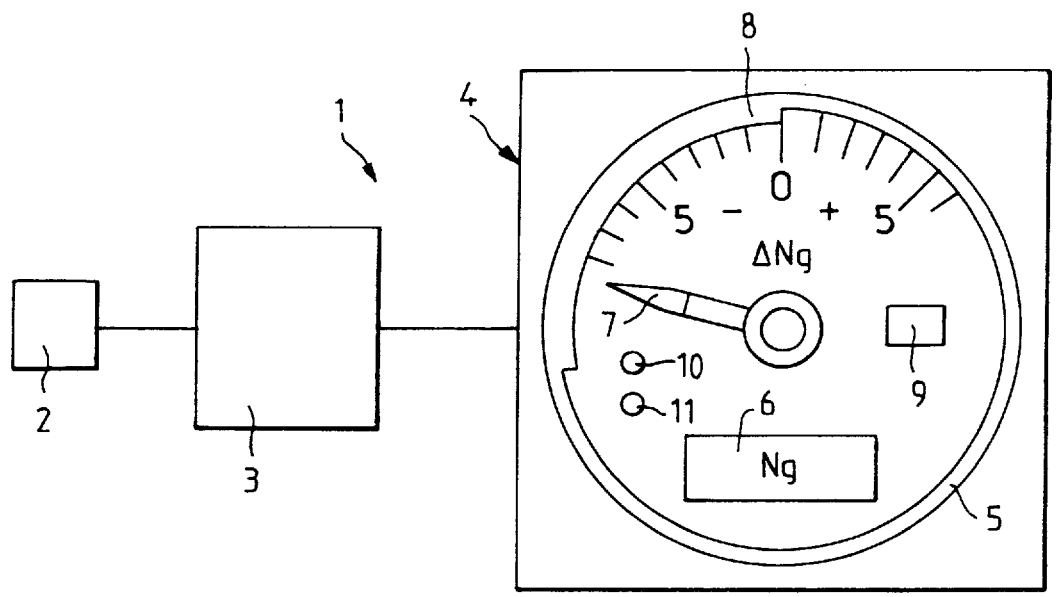
FIG. 1 is a block diagram of the flight indicator according to the invention.

As can be seen in FIG. 1, the indicator 1 according to the invention comprises a sensor 2 capable of delivering data relating to the speed (Ng) of the gas generator (or rotational speed) of the engine, which may be a direct signal coming from the engine phonic wheel. The sensor 2 is connected to a computer 3 capable of calculating, from the data relating to the speed of the gas generator, a data item $\Delta$Ng which represents the difference between the actual value of Ng and the reference value on take-off, i.e. $\Delta Ng=Ng-Ng^*_{pmd}$. Said data, which is also processed in the computer 3 so that it can be displayed, is transmitted to display means 4 which show, on a display screen 5, the data relating to the values of the speed Ng of the gas generator and of $\Delta$Ng.

Figure 2:
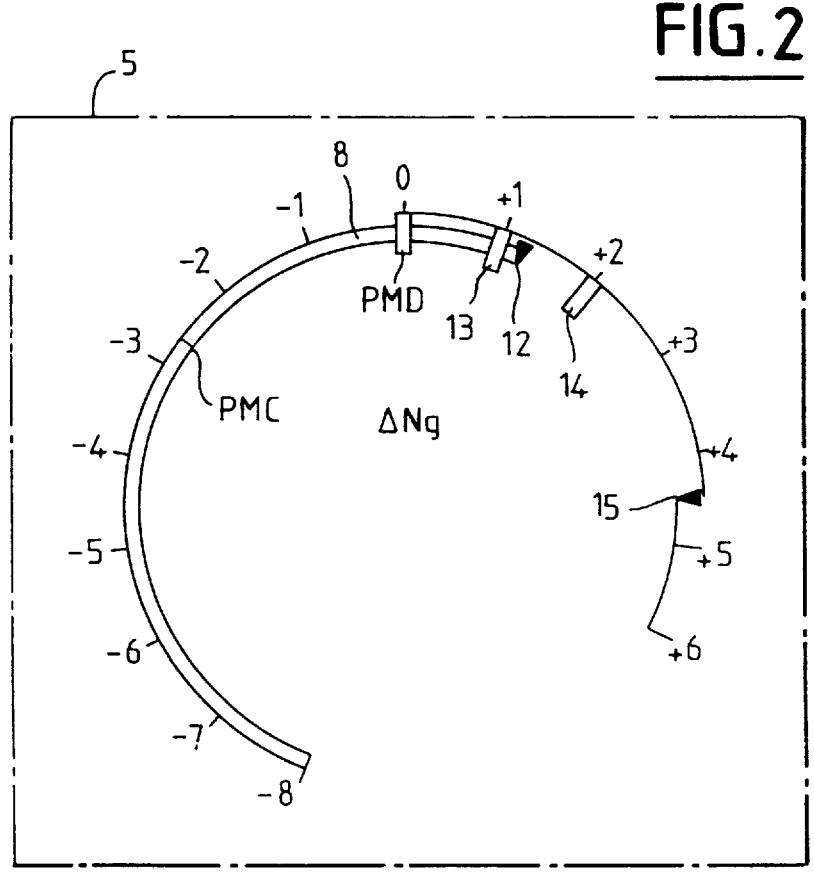
FIG. 2 shows in greater detail the display screen associated with the indicator according to the invention.

More specifically, the value of the speed Ng of the gas generator may be indicated by a digital display 6 (for example one using liquid crystals), whereas the value of $\Delta$Ng is represented by the position of a pointer 7 (in the drawing, the pointer 7 is "inactive") moving between two mechanical stops, not shown, across a dial 8 which has a scale graduated in percentages (for example from −8 to +6 as indicated) including markings which will be explained hereinbelow with reference to FIG. 2.

The display screen 5 may also show a certain number of other indications, such as an indication 9 of an all-or-nothing signal coming directly from the engine discharge valve, the characteristics of which signal are:

0 volts: discharge valve open open circuit: discharge valve closed.

Furthermore, for twin-engined aircraft in which one of the engines is not operating, a situation known as OEI ("One-Engine-Inoperate") power, an all-or-nothing signal is supplied by the computer and indicates that the computer has selected the OEI 30" power level, the characteristics of which are:

0 volts, for OEI 30" selected: diode 10 illuminated, open circuit, for OEI 30" not selected: diode 10 switched off, 0 volts discontinuous when the OEI 30" power has been used for 25 seconds consecutively and when the pilot has to demand the lower level, the diode 10 flashes. Flashing ceases as soon as the level drops below the OEI 2 min power (plus one setting margin of, for example, 0.4% of Ng) or when the OEI 2 min power level is selected by the pilot.

When the computer selects the OEI 2 min power level, this supplies an all-or-nothing signal, the characteristics of which are:

0 volts, for OEI 2 min selected: diode 11 illuminated, open circuit, for OEI 2 min not selected: diode 11 switched off, 0 volts discontinuous when the OEI 2 min power has been used for 2 minutes and 25 seconds consecutively and the pilot has to reduce the pitch in order to display the level below, the diode 11 flashes. Flashing ceases as soon as the level drops below the unlimited OEI power (plus a control margin of, for example, 0.3% of Ng).

Obviously in this case, in normal flight (twin-engined), no diodes should be illuminated. By contrast, when flying on one engine, one of the two diodes must be illuminated.

In order not to act to the detriment of the performance of the engine which is still in service (when one engine breaks down during twin-engined flight) the power consumption P2 (which corresponds to air tappings for air-conditioning the cabin, for example) is automatically cut off as soon as it is detected that the transient limit for twin-engined flight has been exceeded. Heating, which consumes much of the P2 power, is also cut off for the case of blocking the P2 tapping valve. Only the inflatable seals and the automatic de-icing of the horizontal empennage, which do not consume a lot of power, retain their P2 power supply. The heating can be switched back on again by the crew as soon as the unlimited OEI regime is displayed.

The marks indicated on the dial 8 are detailed below with reference to FIG. 2, the numerical values being given merely by way of example:

green arc (up to PMC): −8 to −2.7 yellow arc (PMC to PMD): −2.7 to 0 red radial line (PMD): 0 twin-engined transient red triangle 12: +1.3 discontinuous yellow radial line 13

(unlimited OEI): +1.0 discontinuous red radial line 14 (OEI 2 min): +2.0 transient red triangle 15 (OEI 30"): +4.5

It can thus be seen that the dial 8 is, in fact, essentially split into two regions:

twin-engined operation from −8 to +1.3

OEI power from +1 to +4.5.

I claim:

1. An aircraft flight indicator intended to supply a data item regarding the power margin available on at least one engine of the aircraft as a function of the flight conditions, comprising at least one sensor, calculation means, and display means, wherein:

the sensor (2) is capable of delivering data relating to the speed (Ng) of the gas generator of the engine, the calculation means (3), using the data relating to the speed (Ng) of the gas generator, allow the calculation of a data item $\Delta$Ng representing the difference between the actual value of Ng and the reference value on take-off irrespective of the flight mode of the aircraft, and allow said data to be processed so that it can be displayed, and the display means (4) show the data relating to the values of the speed Ng of the gas generator and of $\Delta$Ng on a display screen (5).

2. The indicator as claimed in claim 1, wherein the value of the speed Ng of the gas generator is indicated by a digital display (6) on said display screen (5).

3. The indicator as claimed in claim 1, wherein said display screen (5) comprises an indication (9) of a signal coming from the engine discharge valve.

4. The indicator as claimed in claim 1, wherein said display screen (5) shows indications (10, 11) relating to the operation of a twin-engined aircraft in which one of the engines has broken down.

5. The indicator as claimed in claim 1 wherein the value of $\Delta$Ng is represented, on said display screen (5), by the position of a pointer (7) moving over a dial (8).

6. The indicator as claimed in claim 5, wherein said dial (8) has a scale which is graduated in percentages, showing a certain number of regions and marks which correspond to specific operating statuses of the aircraft.

\* \* \* \* \*